US008709135B2

(12) United States Patent
Krumbholz

(10) Patent No.: US 8,709,135 B2
(45) Date of Patent: Apr. 29, 2014

(54) VAPOR RECOVERY SYSTEM UTILIZING COMPRESSION-CONDENSATION PROCESSES AND RELATED METHODS

(76) Inventor: Carol Diane Krumbholz, Orange, CA (US)

( * ) Notice: Subject to any disclaimer, the term of this patent is extended or adjusted under 35 U.S.C. 154(b) by 457 days.

(21) Appl. No.: 13/202,072

(22) PCT Filed: Aug. 20, 2010

(86) PCT No.: PCT/US2010/046232
§ 371 (c)(1),
(2), (4) Date: Aug. 17, 2011

(87) PCT Pub. No.: WO2012/023949
PCT Pub. Date: Feb. 23, 2012

(65) Prior Publication Data
US 2012/0042691 A1 Feb. 23, 2012

(51) Int. Cl.
*B01D 53/02* (2006.01)
*B01D 53/00* (2006.01)
B01D 53/047 (2006.01)
B01D 53/75 (2006.01)
B01D 53/26 (2006.01)

(52) U.S. Cl.
CPC ............ *B01D 53/002* (2013.01); *B01D 53/047* (2013.01); *B01D 53/75* (2013.01); *B01D 53/265* (2013.01); *B01D 2253/102* (2013.01); *B01D 2253/104* (2013.01); *B01D 2257/204* (2013.01); *B01D 2257/2064* (2013.01); *B01D 2257/2066* (2013.01); *B01D 2257/70* (2013.01); *B01D 2257/708* (2013.01); *B01D 2257/80* (2013.01); *B01D 2259/402* (2013.01)
USPC .............. 95/90; 95/39; 95/41; 95/96; 95/117; 95/141; 95/142; 95/148; 95/288; 96/111; 96/121; 96/132; 96/413; 405/128.1; 405/128.2; 405/128.7; 62/600; 62/617; 210/800

(58) Field of Classification Search
CPC .... B01D 53/002; B01D 53/047; B01D 53/75; B01D 53/265; B01D 2253/102; B01D 2253/104; B01D 2257/204; B01D 2257/2064; B01D 2257/2066; B01D 2257/70; B01D 2257/708; B01D 2257/80; B01D 2259/402
USPC ........... 95/39, 41, 90, 96, 117, 141, 142, 148, 95/288; 96/111, 121, 132, 413; 405/128.1, 405/128.2, 128.7; 62/600, 617; 210/800
See application file for complete search history.

(56) References Cited

U.S. PATENT DOCUMENTS 4,235,081 A * 11/1980 Dowling ........................... 62/93
4,421,532 A 12/1983 Sacchetti et al.
(Continued)

FOREIGN PATENT DOCUMENTS

EP 1923123 3/2004

*Primary Examiner* — Christopher P Jones
(74) *Attorney, Agent, or Firm* — Brown Rudnick One Financial Center

(57) ABSTRACT

An off gas extraction system cleans common sources of off gas, such as storage tanks and polluted soils. Off gas is extracted, followed by compression and condensation. Compression and condensation produce an off gas that can be reintroduced as a treated gas into the off gas source. Alternatively, a regenerative absorber cleans the treated gas by adsorbing residual chemical vapor and concentrates the removed chemical vapors and reprocesses them. If the treated gas is not reintroduced into the off gas source, conventional scrubbers may used on the back end of the system to produce a final exhaust as prescribed by environmental regulation. Methods of accomplishing the same are similarly provided, including novel methods for degassing storage tanks and treating polluted soils to meet current environmental regulations, as well as green technology and sustainability initiatives.

13 Claims, 10 Drawing Sheets

(56) References Cited

U.S. PATENT DOCUMENTS

| | | |
|---|---|---|
| 4,793,832 A | 12/1988 | Veltman et al. |
| 5,152,812 A | 10/1992 | Kovach |
| 5,740,682 A | 4/1998 | Lavie |
| 6,712,885 B1 * | 3/2004 | Basseen et al. ............. 95/288 |
| 7,260,949 B2 * | 8/2007 | King et al. ............. 62/176.6 |
| 7,658,789 B1 | 2/2010 | Krumbholz |
| 2004/0045440 A1 | 3/2004 | Baseen |
| 2005/0086959 A1 * | 4/2005 | Wilson et al. ............. 62/228.3 |
| 2008/0314062 A1 * | 12/2008 | Ritchey ............. 62/291 |
| 2010/0292524 A1 | 11/2010 | Turner et al. |

* cited by examiner

VAPOR RECOVERY SYSTEM UTILIZING COMPRESSION-CONDENSATION PROCESSES AND RELATED METHODS

CROSS-REFERENCE TO RELATED APPLICATIONS

The instant filing requesting grant of Letters Patent claims full Paris Convention Priority from U.S. Provisional Patent Application Ser. No. 61/375,762, as well as PCT/US2010/046232, both filed Aug. 20, 2010 in the name of the present inventor. Both of the referenced applications are expressly incorporated herein by reference, as if fully set forth herein.

BACKGROUND

This disclosure relates to devices and methods for removing contaminated soil vapor. Specifically, the present invention offers for consideration novel vapor recovery systems utilizing compression condensation processes, among other things.

SUMMARY

A vapor recovery system provides superior results to other systems for removing volatile organic compounds and petroleum hydrocarbons from common sources of such pollutants, such as above ground or underground storage tanks and transportable storage tanks. A vapor stream is extracted from a selected source. Depending on the parameters of the selected source and the constituents of concern to be treated, an appropriate technique or combination of techniques including compression, chilling, reheating, condensation, and regeneration, and final treatment are selected. The selected technique or combination of techniques produce liquid condensates and a final vapor stream that is either recirculated back into a source, treated with carbon, thermally or otherwise destroyed, or expelled into the atmosphere. Methods of accomplishing the same are similarly provided, including new ways for characterizing sources of volatile or semi-volatile vapors, optimizing target vapor stream treatment technique selection and processing of the same to achieve cost effective compliance with changing environmental regulations.

According to a feature of this disclosure, a system for extracting pollutants from a vapor stream is disclosed comprising, in combination: a vapor extraction source, a compressor, a first heat exchanger to condense fluid from off gas and reheat the exhausted off gas, a second heat exchange system to condense fluid from off gas, a regenerative adsorbing unit having at least one regenerative adsorber, and a final treatment step.

According to another feature, one or many of the first heat exchangers, regenerative adsorbers, and final treatment steps may be eliminated or bypassed based on many factors disclosed herein, including the parameters of the selected source, the constituents of concern to be treated, and the jurisdiction's environmental regulations.

According to another feature, the compressor may act by any combination of the following; apply vacuum upon the off gas source, compress the off gas stream, and force the off gas stream through the vapor recovery system. The vacuum applied on the off gas source, the level of compression of the off gas stream, the temperature of compression, the temperature of the compressed off gas exiting the compressor, and the flow rate of the off gas stream through the vapor extraction system can be adjusted to optimize the recovery of contaminants from different sources of vapor and off gas to be treated as known by artisans.

According to another feature, novel techniques to prevent the accumulation of frozen condensate in the vapor extraction system are disclosed. A method of reheating compressed off gas as it exits a first heat exchange system in order to optimize the functionality of the second heat exchange system is disclosed.

According to another feature, a regenerative absorber is disclosed comprising, in combination: at least one chamber containing activated alumina, where each chamber has at least one inlet and at least one outlet. The activated alumina is charged with a pollutant at high pressure and the pollutant is unloaded from the activated alumina at low pressure.

Moreover, further features of this disclosure are disclosed including a method of extracting pollutant from a vapor stream comprising, in combination: selecting optimum flow, compression, condensation, regeneration, and final treatment parameters for the vapor stream to be treated, extracting a vapor stream, compressing the vapor stream to the selected level and temperature of compression, achieving the desired flow rate of the compressed vapor stream, condensing the vapor stream through a series of heat exchangers to form at least one liquefied contaminant in each heat exchanger, reheating the vapor stream prior to at least one heat exchanger in order to optimize the efficiency of that heat exchanger, adsorbing any residual pollutants from the compressed condensed vapor stream with at least one regenerative adsorber to produce a substantially pollutant-free off gas, scrubbing the substantially pollutant-free off gas with a final treatment selected from the list of activated carbon, thermal oxidation, chemical oxidation, reintroduction into the source area, and determining compliance with applicable regulatory requirements.

Further features of this disclosure are disclosed including a method of extracting pollutant from a vapor stream comprising, in combination; selecting optimum flow, compression, condensation, and recirculation parameters for the vapor stream to be treated, extracting a vapor stream, compressing the vapor stream to the selected level and temperature of compression, achieving the desired flow rate of the compressed vapor stream, condensing the vapor stream through a series of heat exchangers to form at least one liquefied contaminant in each heat exchanger, reheating the vapor stream prior to at least one heat exchanger in order to optimize the efficiency of that heat exchanger, recirculating the substantially pollutant-free off gas to the off gas source, and determining compliance with applicable regulatory requirements.

Still other features of this disclosure are disclosed including a method for optimizing extraction of pollutant from a vapor stream comprising, in combination: initiating testing to determine contaminants to be addressed at the selected source, determining the optimum flow, compression, condensation, regeneration, and final treatment parameters to treat the source vapor stream so that the vapor extraction flow and chemical recovery rates are optimized, determining the optimum flow, compression, condensation, regeneration, and final treatment parameters to treat the source vapor stream so that the final treatment selected is the most cost effective, cross referencing this preliminary plan to a database of recovery parameters defined by a regulatory authority, executing the plan with a vapor extraction system to recover the contaminants, verifying the nature and quantities of the species of recovered contaminants to form a set of data, and confirming that the data satisfy regulations imposed by a regulatory body.

Finally according to a feature of this disclosure, there is disclosed a method which comprises; determining a source of at least one vapor stream, recovering at least one contaminant from at least one vapor stream, separating recovered contaminants into at least one subset of contaminants, and recycling the separated recovered contaminants for reuse.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
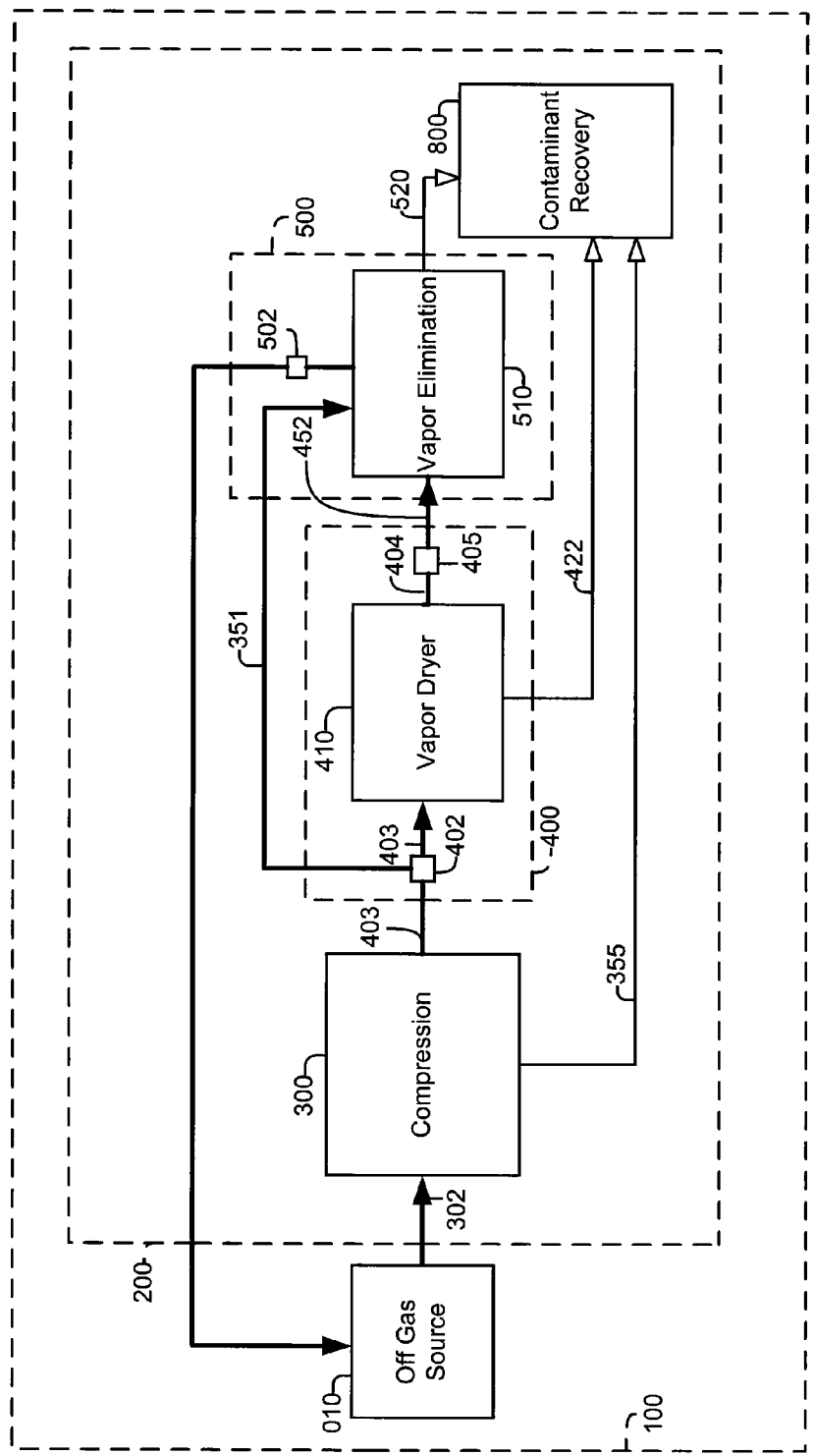
FIG. 1 is a block diagram of embodiments of an off gas treatment system.

In the following detailed description of embodiments of this disclosure, reference is made to the accompanying drawings in which like references indicate similar elements, and in which is shown by way of illustration specific embodiments in which this disclosure may be practiced. These embodiments are described in sufficient detail to enable those skilled in the art to practice this disclosure, and it is to be understood that other embodiments may be utilized and that logical, mechanical, electrical, functional, and other changes may be made without departing from the scope of this disclosure. The following detailed description is, therefore, not to be taken in a limiting sense, and the scope of this disclosure is defined only by the appended claims. As used in this disclosure, the term "or" shall be understood to be defined as a logical disjunction and shall not indicate an exclusive disjunction unless expressly indicated as such or notated as "xor."

This application incorporates by reference U.S. Pat. No. 7,658,789.

As used in this disclosure, the term "fluid" shall be understood to mean materials that flow, i.e, gasses, liquids, or plasmas.

As used in this disclosure, the term "off gas" shall be defined as fluids extracted from contaminated sources and includes soil vapors, previously collected soil vapors, vapors from enclosed sources including tanks, and collected vapors from the production or use of volatile organic compounds, petroleum hydrocarbons, and other volatile vapors. The term vapor is sometimes used herein to be synonymous with the term "off gas" that contains chemical vapors to be recovered.

In the context of a vapor elimination device, the term "recovery" or "recover" refers to thawing or rewarming a heat exchange module that has been cooled in a prior cycle.

The industrial revolution marked a radical change to many aspects of society. Industrialized nations became increasingly productive and urbanized. Gasoline and oil production became centralized. Increased pollution resulted. Soil, air, and water carried unprecedented levels of pollutants over the last 200 years.

Nevertheless, during the middle of the 20th century, social conscience and government sought to eliminate or reduce pollution where possible. The United States government passed strict environmental laws and set aside funds for cleaning polluted natural resources and limiting the emission of carbon dioxide, methane, and volatile vapors into the atmosphere. Similarly, corporations and companies are taking steps to improve the nature and quality of pollutants and to address polluted natural resources.

The venting of explosive vapors from petroleum and gasoline storage tanks is necessary prior to de-sludging and other maintenance events such as repairing floating deck roofs. Traditionally, pollutants and pollutant vapor trapped in the storage tanks have been vented in order to reduce the concentration of vapors to below lower explosive limits. Venting of these vapors releases large amounts of methane and other green house gasses into the environment. Flaming of these vented vapors reduces the detrimental effect on the environment by reducing the amount of methane introduced into the atmosphere, but is not sustainable when vapor BTU levels begin to decline. Thermal destruction via oxidation, using supplemental fuel supplies to bolster a threshold BTU level and maintain burning, was introduced to remedy this problem. However, vast quantities of carbon dioxide and other damaging emissions are emitted by this process. Moreover, this process uses additional fuels to maintain thermal destruction of volatile vapors.

Furthermore, storage tanks and other sources contaminated with high levels of predominately petroleum hydrocarbons present a different problem. Common petroleum hydrocarbons such as jet fuels, Stoddard solvent, gasoline, fuel oils, benzene, toluene, ethylbenzene, xylenes, naphthalene, methyl t-butyl ether, aromatic hydrocarbons, and hexane cannot be compressed in a traditional manner due to their explosive properties. In the presence of detectable concentrations of petroleum hydrocarbons, a traditional compression cycle with compression temperatures below 200° Fahrenheit will cause a portion of the petroleum hydrocarbon vapors to turn from gas to liquid phase inside the compression stage of the compressor when the pressure is rapidly increased. The introduction of liquid phase hydrocarbons in the presence of oil will degrade the oil used by the compressor for lubrication and cooling. This disclosure addresses the problem by providing a novel method of preventing the liquefaction of gasses containing petroleum hydrocarbons during compression.

Because common petroleum hydrocarbons have comparatively lower saturation temperatures and pressures than common chlorinated solvents, the utilization of a vapor extraction system using the high compression levels necessary to process and recover chlorinated solvents may result in unnecessary compression and power consumption when the off gas stream contains predominately petroleum hydrocarbons. This disclosure addresses this problem by providing a novel method of regulating the minimum necessary compression parameters of the off gas necessary to maintain a certain desired flow rate through a determined plurality of heat exchangers, regenerative adsorbers, and final treatment steps.

The ideal gas law confirms that the state of a gas is determined by its pressure and temperature. Therefore, the ideal gas law holds that as the pressure of an off gas stream increases, the temperature necessary to reach a given saturation rate decreases. When one or more compression devices increase the pressure level of an off gas stream, pollutants in the compressed off gas stream will condense at a higher temperature compared to the same pollutants in an uncompressed off gas stream. This disclosure addresses this problem by providing a novel method of regulating the pressure of the off gas stream through one or more heat exchangers, regenerative adsorbers, and final treatment steps in order to decrease the cryogenic capacity, complexity, and overall size of condensation system used to recover the entrained pollutants.

As flow rates through the vapor extraction system increase, the rate of chemical recovery through each heat exchanger will increase. At a certain level of increased flow, a given set of heat exchangers will become overloaded with chemical transitioning from gas phase to liquid phase and from liquid phase to solid phase, thus causing blockages in the system, even if it is cycled between refrigeration and thawing cycles. Conversely, if too little a flow of off gas vapors enters through a given set of heat exchangers, the rapid clogging of those heat exchangers with pollutants cooled too rapidly into a solid phase will occur. To overcome this dilemma, this disclosure teaches a novel method for regulating the flow of the vapor extraction system by utilizing different series of heat exchangers.

Turning now to embodiments illustrated in FIG. 1, vapor extraction and recovery system 100 is shown. Vapor extraction and recovery system 100 generally comprises a connection of off gas treatment system 200 to an off gas source 010. In FIG. 1, off gas treatment system 200 comprises a number of subsystems, according to embodiments, including vacuum, compression, and flow module 300, vapor dryer module 400, vapor elimination module 500, and contaminant recovery module 800. Vacuum, compression, and flow module 300 removes off gas from an off gas source 010, removes liquid constituents recovered in the off gas removal process, compresses the off gas, and produces flow pressure to move the off gas through vapor extraction and recovery system 100. Vapor dryer module 400 cools the off gas, removes liquid constituents and substantially all water from the off gas, and reheats the off gas. Vapor elimination module 500 further removes contaminated vapor from the gas and further cools the off gas, producing a substantially dry gas that is free of chemical vapors and routes this gas back to the off gas source 010. Contaminant recovery module 800 separates condensed and collected chemical constituents by specific gravity, and stores the constituents in one or more storage units.

Figure 2:
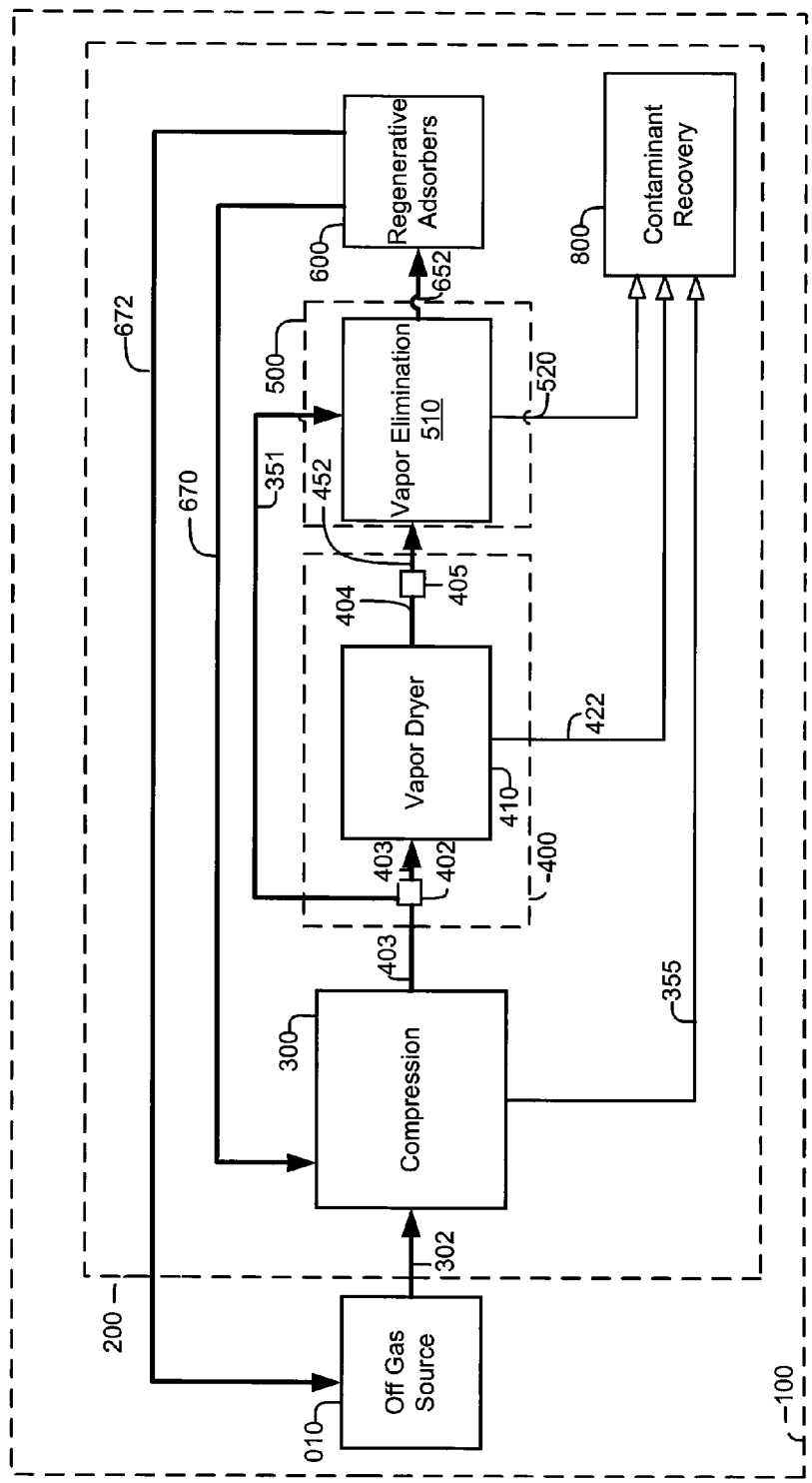
FIG. 2 is a block diagram of embodiments an off gas treatment system including a regenerative adsorber unit.

According to embodiments illustrated in FIG. 2, vapor extraction and recovery system 100 comprises the same core features as vapor extraction and recovery system 100 illustrated in FIG. 1 with the addition of regenerative adsorber unit 600. According to these embodiments, vapor dryer module 400 cools the off gas, removes liquid constituents and substantially all water from the off gas, and reheats the off gas. Vapor elimination module 500 further removes contaminated vapor from the gas and further cools the off gas, producing a substantially dry gas as an intermediate result. Regenerative adsorber unit 600 further removes contaminated vapors from the off gas, and routes contaminated gas back to vacuum, compression, and flow module 300. Also routed from regenerative adsorber unit 600 is an air stream that is substantially free of chemical vapors back to off gas source 010. This air stream that is substantially free of chemical vapors may be expelled into the atmosphere directly, further scrubbed with granular activated carbon, or directed to further processes.

Figure 5:
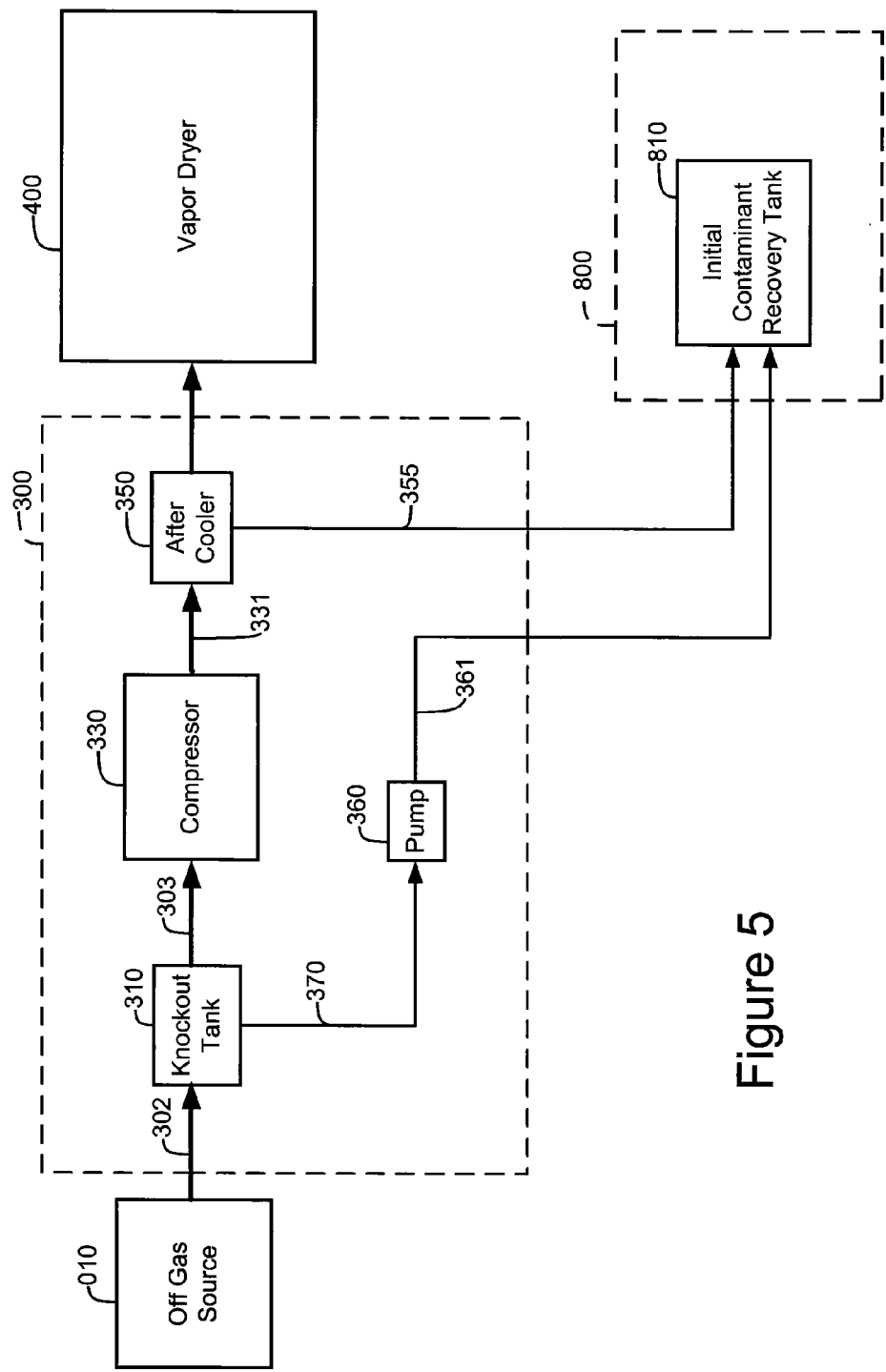
FIG. 5 is a block diagram of embodiments of vacuum, compression, and flow module.

According to embodiments and as illustrated in FIG. 5, contaminated vapor is removed from off gas source 010 and transferred via inlet conduit 302 into vacuum, compression, and flow module 300. According to embodiments, liquid (e.g., water) and gas are separated using gas/liquid separator 310 to prevent liquid from entering compressor 330. Separated liquid is routed from gas/liquid separator 310 via liquid outlet 370, while gas separated in gas/liquid separator is routed to compressor 330 via gas outlet 303. According to embodiments, gas/liquid separator 310 may be, for example, a 120 gallon Manchester vertical tank (Manchester Tank, Franklin, Tenn.).

Gas outlet 303 routes separated gas from gas/liquid separator 310 to compressor 330 (e.g., Quincy model QSI 300 air compressor, 255 cfm at 15" Hg and 155 psi, 100 horsepower, 3 phase, air cooled 460 volt electric motor). Compressor 330 creates a vacuum that pulls an off gas stream from off gas source 010. Compressor 330 may be any number of commercially available air compressor systems known to artisans (e.g., Quincy model QSI 370i air compressor, 300 cfm at 15" Hg and 155 psi, 100 horsepower, 3 phase, air cooled 460 volt electric motor). A person of ordinary skill in the art will know and understand the applicable rotary screw, reciprocating, oil-less, and other compressors to use based on the relevant parameters in the system. Other similar vacuum creation devices may be used depending on the desired gas flow rate, etc., as known and understood by a person of ordinary skill in the art.

Liquid is moved through liquid outlet 370 with transfer pump 360, which pumps liquid from gas/liquid separator 310 into initial contaminant recovery tank 810 via liquid conduit 361. Depending on the source of the off gas stream and prior separation of liquid before entry into inlet conduit 302, little water will be extracted from off gas source 010. However, in air sparging or dual phase soil vapor extraction applications, liquid (e.g., water) flow by may occur, necessitating gas/liquid separator 310 to separate the liquid from the gas.

Transfer pump 360 removes liquid from gas/liquid separator 310. Transfer pump 360 may be, for example, a centrifugal 120/230 volt ½ horsepower motor pump capable of moving 20 gallons per minute, according to embodiments. Naturally, off gas source 010 that produce large volumes of liquid may require transfer pump 360 that is capable of pumping liquid at a more rapid rate. Similarly, off gas sources 010 producing only nominal amounts of water may be fitted with transfer pump 360 that moves fewer gallons per minute. The exact choice of transfer pump 360 will be known and understood by artisans.

Initial contaminant recovery tank 810 may be any tank suitable for the purpose of collecting contaminated liquids. As described below, a specific gravity separator may be disposed between transfer pump 360 and initial contaminant recovery tank 810 along liquid conduit 361 to separate each specific contaminant from the other contaminants, according to embodiments.

As illustrated according to embodiments shown in FIG. 5, vacuum created by compressor 330 moves contaminated off gas from gas/liquid separator 310 to compressor 330. According to embodiments, compressor 330 receives information from programmable logic controller 910 (see FIGS. 3 and 4), including: optimum off gas pressure settings for compressor 330, optimum temperature for compressor 330 to heat off gas during compression, optimum vacuum pressure for compressor 330 to apply to off gas source 010, and optimum resulting flow rate from exhaust of compressor 330. According to embodiments, compressor 330 compresses contaminated off gas to a pressure range between about approximately 75 and 175 psi. According to embodiments, compressor 330 heats compressed off gas to temperature range between about approximately 120 and 235 degrees Fahrenheit. According to embodiments, compressor 330 applies a vacuum on the off gas stream to be extracted from off gas source 010 of between approximately 0 and 20 in. Hg. According to embodiments and depending upon the desired pressure, heat, and vacuum levels, compressor 330 attains an off gas exhaust stream of between approximately 0 and 380 cfm when compressor 330 is a Quincy model QSI 370i air compressor. Compressing off gas containing contaminated vapor concentrates the contaminated vapor for later removal in vapor dryer module 400, vapor elimination module 500, and optionally, regenerative adsorber unit 600.

After off gas is compressed with compressor 330, compressed contaminated off gas is routed to aftercooler 350 via conduit 331, which commences a first round of cooling for the compressed contaminated off gas. According to embodiments, aftercooler 350 is comprised of one or more of an Arrow model AFC 120-1 air to air cooler systems (at 150 psi and 180 scfm), or a similar arrangement with different flow and temperature ratings. As the contaminated off gas is compressed, temperature of gas increases substantially according to the ideal gas law. Aftercooler 350 provides the initial cooling of the compressed contaminated off gas prior to condensation in vapor dryer module 400 and vapor elimination module 500. According to embodiments, aftercooler 350 cools compressed off gas from approximately 185 degrees Fahrenheit to approximately 90 degrees Fahrenheit. According to other embodiments, programmable logistics controller 910 engages and disengages the cooling fan motor of aftercooler 350 so that the off gas exiting the aftercooler 350 to maintain a constant temperature, for example 100 degrees Fahrenheit. As the compressed contaminated off gas cools inside aftercooler 350, initial condensation may occur and contaminated vapor may condense to a liquid. The condensate is transferred from aftercooler 350 via aftercooler conduit 355 to initial contaminant recovery tank 810. According to embodiments, aftercooler conduit 355 may connect into liquid conduit 361 or liquid outlet 370.

Turning again to FIGS. 1-4 and according to embodiments, exhaust from vacuum, compression, and flow module 300 is directed via control valve 402 (FIG. 1) to either vapor dryer module 400 via vapor dryer inlet conduit 403 or to vapor elimination module 500. Programmable logistics controller 910 operates control valve 402 and determines the direction of the compressed off gas flow. When control valve 402 directs compressed off gas flow to vapor dryer module 400, the programmable logistics controller 910 will also open control valve 405, allowing off gas exiting vapor dryer module 400 to enter vapor elimination module 500.

Figure 6:
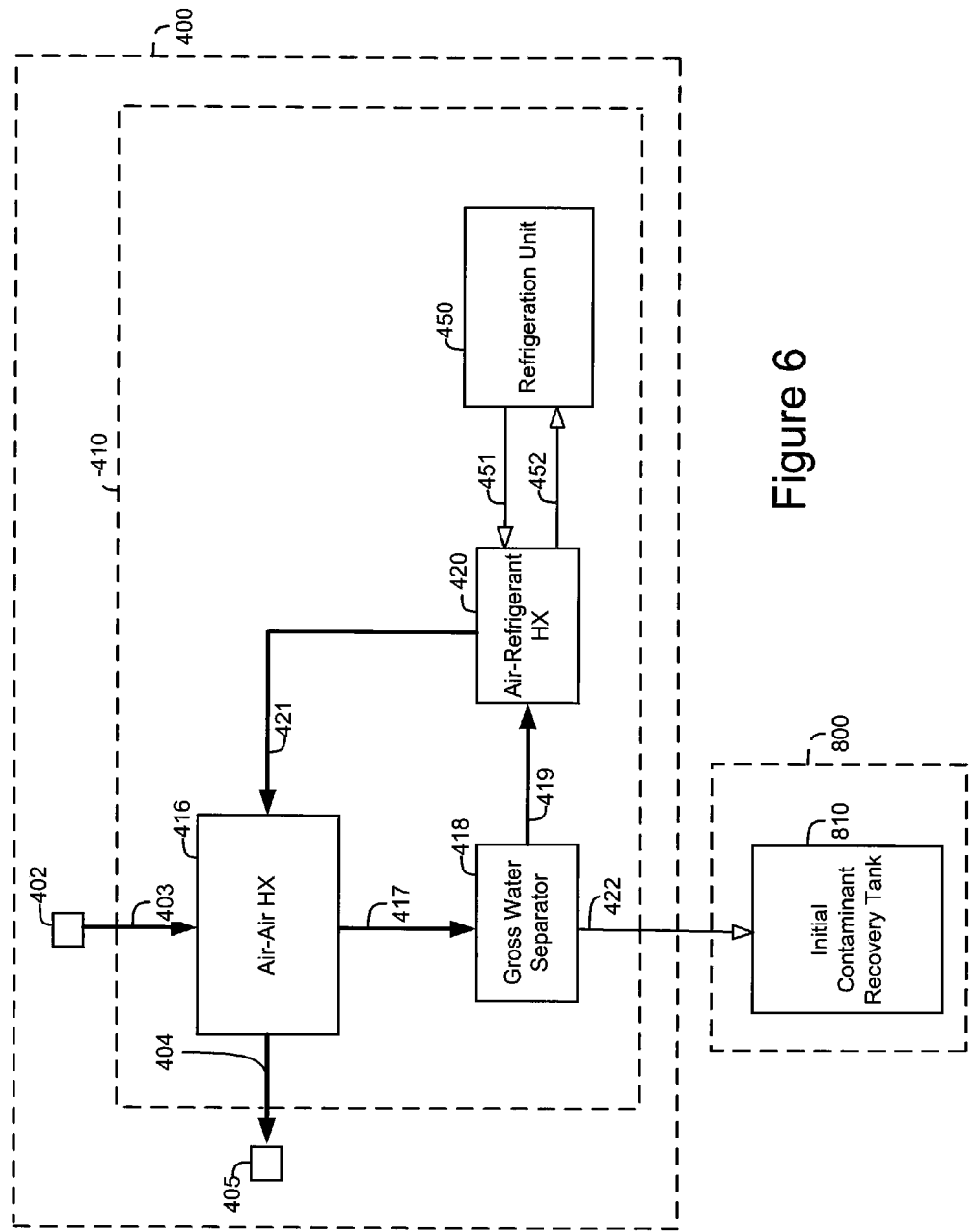
FIG. 6 is a block diagram of embodiments of vapor dryer module.

According to embodiments, vapor dryer module 400 comprises condensation module 410 and control valves 402, 404. According to embodiments and as illustrated in FIG. 6, condensation module 410 is a modified air dryer, such as a ERF-500A-236 refrigerant air dryer rated at 230 psi for a 35-39° F. pressure dew point, or a similar unit with different flow and temperature ratings. According to embodiments, vapor is first directed to condensation module 410.

According to embodiments, condensation module 410 is comprised of air/air heat exchanger 416, gross water separator 418, air/refrigerant heat exchanger 420, and refrigerant unit 450. In condensation module 410, the compressed vapor stream is cooled (e.g., from approximately 85° F. to approximately 39° F.) causing condensation of pollutants and water. Condensed liquid pollutant and water from the now-cooled vapor stream is directed to initial contaminant recovery tank 810 via conduit 422, and the vapor stream is heated to (e.g., to about approximately 75° F.) as it exits condensation module 410.

According to embodiments, hot saturated compressed vapor stream from vacuum, compression, and flow module 300 entering condensation module 410 first enters air/air heat exchanger 416, which cools the air, and gross water separator 418 removes the condensed liquid. The compressed vapor stream enters air/air heat exchanger 416 via vapor elimination conduit 403 where it is pre-cooled by the air discharged from air/refrigerant heat exchanger 420 exiting the condensation module via conduit 421. Cooled vapor is routed from gross water separator 418 to air/refrigerant heat exchanger 420 via conduit 419, which further cools the compressed vapor stream. In air/refrigerant heat exchanger 420, the compressed vapor stream is further cooled (e.g., to about approximately 39° F.), and additional condensed liquid is separated from the vapor stream. Conduit 421 transfers the vapor stream to air/air heat exchanger 416 where it acts as the cooling medium for the previous pre-cooling stage. Air/air heat exchanger 416 also reheats the discharge gas to optimize the temperature of the vapor stream for entry into vapor elimination module 500. Discharge gas exiting air/air heat exchanger 416 exits condensation module 410 and vapor dryer module 400 via vapor dryer module outlet 404 and to control vale 405, where the vapor stream is directed to vapor elimination module 500.

According to embodiments, when control valve 402 directs compressed off gas flow to vapor elimination module 500, programmable logistics controller 910 keeps control valve 405 closed, preventing the reversal of flow through condensation module 410. According to embodiments, vapor elimination module 500 comprises condensation module 510 and control valve 502, as illustrated in FIGS. 1-4.

Figure 7:
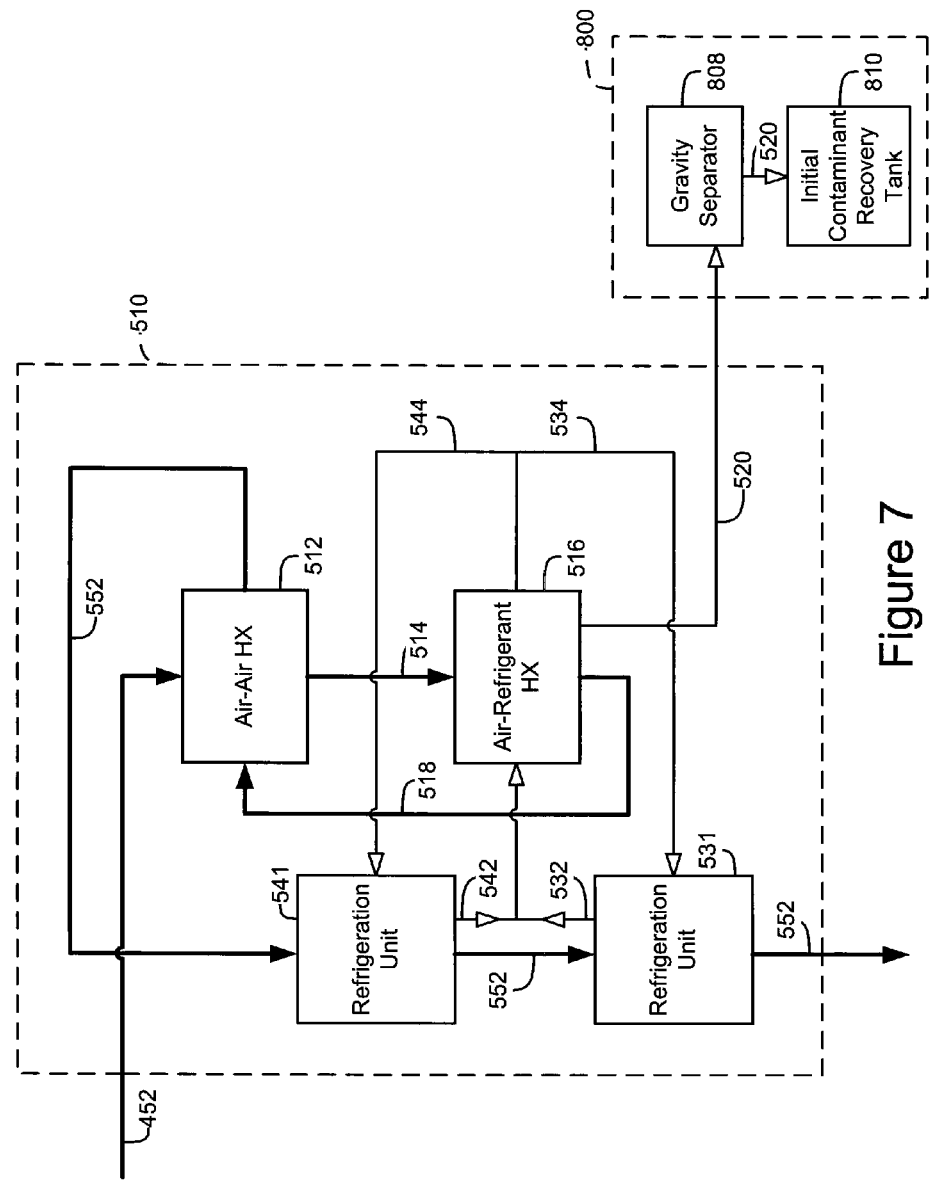
FIG. 7 is a block diagram of embodiments of a condensation module.

According to an embodiment shown in FIG. 7, further differentiation of other systems is schematically illustrated, whereby, for example condensation module 510 comprises a heat exchange system for reducing the temperature of the off gas containing contaminated vapor. This module responds to ongoing challenges others have had in dealing with certain volatiles which are not easily converted into the liquid phase. The process causes many chemicals to condense into a liquid, which is subsequently routed to contaminant recovery module 800.

According to embodiments, condensation module 510 comprises a plurality of heat exchangers 512a, 512b, 516a, and 516b. Air/air heat exchanger 512 accomplishes initial cooling of compressed contaminated gas. Air/air heat exchanger 512 removes virtually all of the residual water and water vapor in the compressed gas. After initial cooling has occurred in air/air heat exchanger 512, the compressed contaminated gas is transferred to air/refrigerant heat exchanger 516 via warm vapor conduit 514. Further cooling of the compressed contaminated vapor occurs in air/refrigerant heat exchanger 516, causing condensation of the compressed contaminated vapor as the temperature of the gas containing the contaminated vapor drops below condensation point depending on the chemical being condensed. At this stage the compressed gas is virtually dry and free of water and water vapor, according to embodiments.

Air/air heat exchanger 512 and air/refrigerant heat exchanger 516 work in tandem to heat and cool their respective input and output gasses. The cold output gas from air/refrigerant heat exchanger 516 is routed through air/air heat exchanger 512 via cold vapor conduit 518. Warm gas incoming to air/air heat exchanger 512 from either aftercooler 350 via control valve 402 or condensation module 410 via control valve 405 is therefore cooled by the cold gas routed into air/air heat exchanger 512 and the cold gas in cold vapor conduit 518 is likewise warmed by warm gas incoming from either aftercooler 350 via control valve 402 or condensation module 410 via control valve 405.

Figure 8:
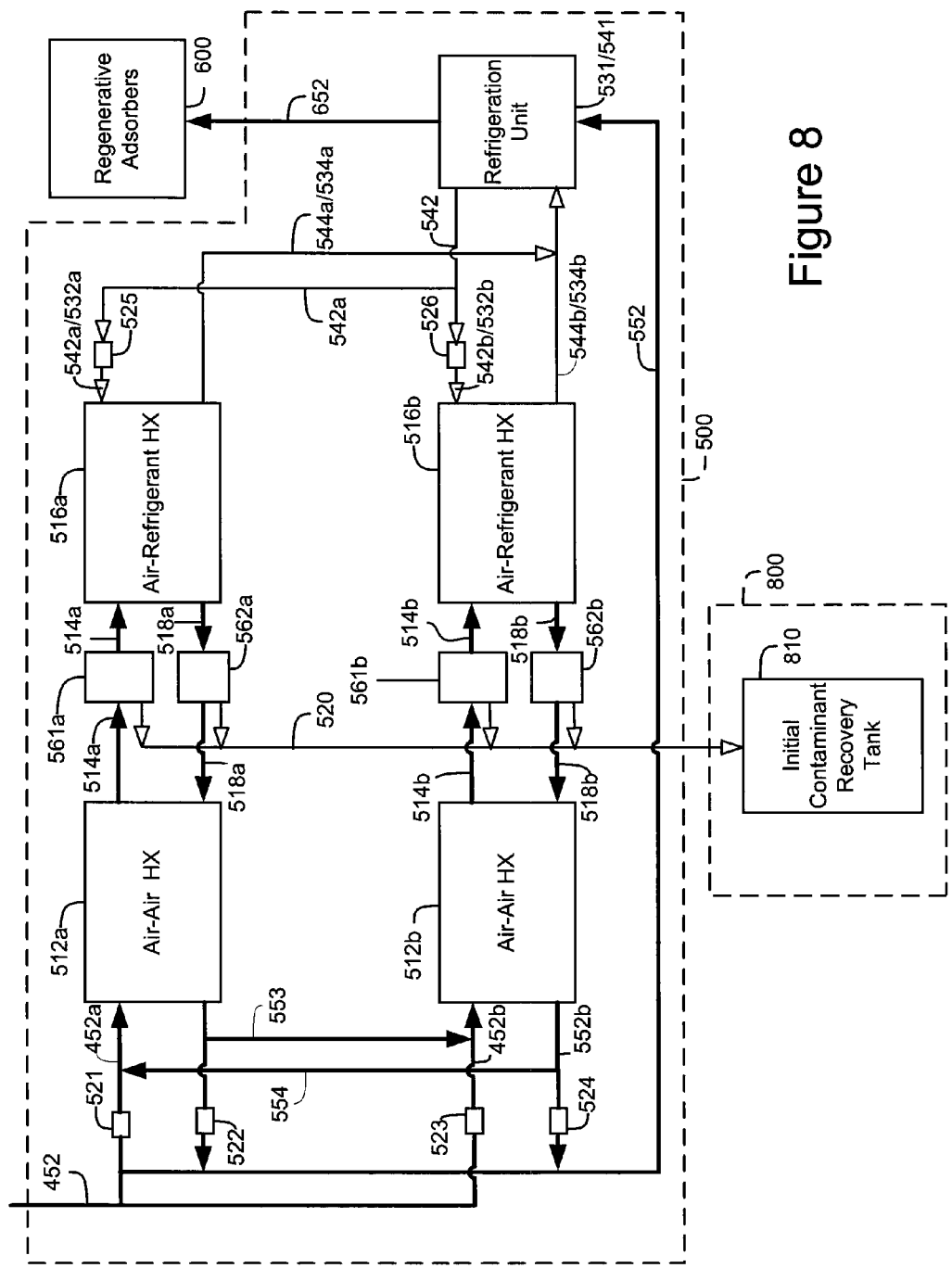
FIG. 8 is a block diagram of embodiments of a vapor elimination module.

According to embodiments shown in FIG. 8, air/air heat exchanger 512 and air/refrigerant heat exchanger 516 are disposed in condensation module 510 in a series of two pairs, each pair comprising one air/air heat exchanger 512 and one air/refrigerant heat exchanger 516. Other configurations with additional air/air exchangers 512 or air/refrigerant heat exchangers 516 are also contemplated. According to embodiments, two Quincy type QSI 370i compressors are used in vacuum, compression, and flow module 300 to apply a vacuum (e.g., 15 in. Hg) on the off gas source 010 and a compression level of (e.g., 155 psi) on the off gas stream causing a resultant flow of compressed off gas sufficient for the pairs of heat exchangers 512, 516 (e.g., approximately 500 cfm).

The compressed off gas flows through vapor condensation module 510 when control valve 402 directs the off gas to condensation module 510, according to embodiments. Accordingly, the programmable logistics controller 910 activates both heat exchanger pairs 512, 516 to work in cycles. During a primary cooling cycle, valves 521, 524, 526 are open and valves 522, 523, 525 are closed and refrigerant is delivered to air/refrigerant heat exchanger 516b. Compressed off gas delivered through either valve 402 or control valve 405 enters module 500 through inlet conduit 452, and is directed through valve 521, conduit 452a, heat exchanger 512a, conduit 514a, collection can 561a, heat exchanger 516a, conduit 518a, collection can 562a, heat exchanger 512a conduit 552a, conduit 553, conduit 452b, heat exchanger 512b, conduit 514b, collection can 561b, heat exchanger 516b, conduit 518b, collection can 562b, heat exchanger 512b, conduit 552b, valve 524, and conduit 552 when the primary cooling cycle is initiated. Coolant flows from refrigeration units 530, 540 into heat exchanger 516b via valve 526 when the primary cooling cycle is initiated. Compressed off gas passing through heat exchangers 512a, 516a is preliminarily cooled to about approximately 15° Fahrenheit by the residual cold temperature of prior cooling cycles. Any frozen condensate in heat exchangers 512a, 516a from the prior cooling cycle is heated by the comparatively warmer compressed off gas entering said heat exchangers. Initial condensate of the compression off gas forms in heat exchangers 512a, 516a. Condensate is collected in collection cans 561a, 562a and transported to contaminant recovery module 800. The preliminarily cooled off gas flows through conduits 552a, 553, and 552b and enters heat exchangers 512b, 516b. Compressed off gas passing through heat exchanger 516b is cooled to about approximately −45° Fahrenheit as refrigerant flows through heat exchanger 516b. This cold gas is directed at the return side of heat exchanger 512b, where it is warmed to approximately −20° Fahrenheit by the gas flowing through the off gas side of heat exchanger 512b. Similarly, the approximately 15° Fahrenheit gas flowing through the off gas side of heat exchanger 512b is pre-cooled to about approximately 5° Fahrenheit by the cold gas flowing through the return side of heat exchanger 512b. Cold gas exiting the return side of heat exchanger 512b flows through conduits 552b, 552 into module 530, 540.

Condensate will continue to form as long as refrigerant remains in air/refrigerant heat exchanger 516b. To remove all condensate, the air/refrigerant heat exchanger pair 512b, 516b must undergo a thawing cycle to completely liquefy the condensate and remove it, which requires the refrigerant level to be reduced from air/refrigerant heat exchanger 516b by closing valve 526.

Thus, according to embodiments when two 512, 516 heat exchanger pairs are operated in a cycle, air/refrigerant heat exchanger pair 512b, 516b cools during the primary cooling cycle while the heat exchanger pair 512a, 516a thaws (i.e., recovers). Once the primary cooling cycle is complete, the respective functions are reversed in what is referred to as the secondary cooling cycle wherein refrigerant is reduced from heat exchanger 516b by closing valve 526, refrigerant is introduced into heat exchanger 516a by opening valve 525, and the heat exchanger pair 512b, 516b begins to thaw while the heat exchanger pair 512a, 516a begins to cool. During the secondary cooling cycle, valves 521, 524, 526 are closed and valves 522, 523, 525 are open and refrigerant is delivered to air/refrigerant heat exchanger 516a. Compressed off gas from either control valve 402 or control valve 405 enters module 500 through inlet conduit 452 or inlet conduit 351 and is directed through valve 523, conduit 452b, heat exchanger 512b, conduit 514b, collection can 561b, heat exchanger 516b, conduit 518b, collection can 562b, heat exchanger 512b, conduit 552b, conduit 554, conduit 452a, heat exchanger 512a, conduit 514a, collection can 561a, heat exchanger 516a, conduit 518a, collection can 562a, heat exchanger 512a, conduit 552a, valve 522, and conduit 552 during the secondary cooling cycle. Coolant flows from refrigeration units 531, 541 into heat exchanger 516a via valve 525 when during the secondary cooling cycle. Compressed off gas passing through heat exchangers 512b, 516b is preliminarily cooled (e.g., to about approximately 15° F.) by the residual cold temperature of prior cooling cycles. Any frozen condensate in heat exchangers 512b, 516b from the prior cooling cycle is heated by the comparatively warmer compressed off gas entering the heat exchangers 512b, 516b, thereby thawing the frozen condensate and preparing the heat exchangers for the next cooling cycle. Initial condensate of the compression off gas forms in heat exchangers 512b, 516b. Condensate is collected in collection cans 561b, 562b and transported to contaminant recovery module 800 via conduit 520. The preliminarily cooled off gas flows through conduits 552b, 554, and 552a and enters heat exchangers 512a, 516a. Compressed off gas passing through heat exchanger 516a is cooled (e.g., to about approximately −45° F.) as refrigerant flows through heat exchanger 516a. This cold gas is directed at the return side of heat exchanger 512a, where it is warmed (e.g., to approximately −20° F.) by the gas flowing through the off gas side of heat exchanger 512a. During each cooling, condensate forms and is collected in collection cans 561a, 562a, 561b, 562b and moved to contaminant recovery module 800. Similarly, the cooled (e.g., the 15° F. gas referenced above) gas flowing through the off gas side of heat exchanger 512a is pre-cooled (e.g., to about approximately 5° F.) by the cold gas flowing through the return side of heat exchanger 512a. Cold gas exiting the return side of heat exchanger 512a flows through conduits 552a, 552 into module 530, 540.

According to embodiments, refrigerant and warm gas to be cooled by refrigerant are input at the same location and experience parallel flow rather than cross flow. In other words, during one cycle the input of off gas is at one Embodiments employing parallel flow are more rapidly cooled, allowing for shorter cycle times and improving the overall efficiency of the system. According to embodiments, cross flow configurations and parallel flow configurations may be chosen on a case by case basis as would be known to a person of ordinary skill in the art. As used herein, the term parallel flow refers to recovering one heat exchange module while using another heat exchange module for final cooling and condensing, until the heat exchange module either experiences a reduce efficient in air flow, condensation, or temperature, etc., or after a given time period has elapsed. Then the flow of incoming off gas is adjusted for the recovery of the heat exchange module (or another heat exchange module in need of recovery) by using another heat exchange module to do the final cooling.

Air/refrigerant heat exchanger 516 exchanges heat as would be known to a person of ordinary skill in the art. That is, the refrigerant provides the cooling for the gas. The final temperature range of the gas depends on the coolant used, airflow, and other factors. According to embodiments, if a majority of contaminant condenses in air/air heat exchanger 512, then gas flow may be increased or cycle time may be decreased as a matter of efficiency. Similarly, where contaminated vapor fails to condense at an efficient rate, gas flow may be decreased or cycle time may be increased to expose gas to refrigerant for a longer period. According to embodiments, the programmable logistics controller 910 selects the proper temperature range and cycle time based on the constituents of concern in the off gas, concentration of those constituents in the off gas, position of control valves 402, 404, pressure of the off gas, and other user-defined parameters.

According to embodiments, when the heat exchangers cycle, gas flow rate remains constant, but the duration the gas is exposed to the heat exchangers is varied. Thus, according to embodiments, the programmable logistics controller 910 sets a fixed cycle time, for example 30 minutes per pair, when two heat exchanger pairs 512, 516 are operated. When the programmable logistics controller 910 detects any decrease in flow rate as measured from a point that is after either of the then-actively-cooling air/refrigerant heat exchangers 516, the programmable logistics controller 910 will instruct the affected air/refrigerant heat exchanger 516 to cycle into a thawing cycle with its associated air/air heat exchanger 512 while the remaining heat exchanger pair 512, 516 continues its cooling cycle, and the programmable logistics controller 910 will simultaneously reset the fixed cycle time. Thus, the flow rate of compressed off gas flowing through any given set of heat exchangers remains constant.

According to embodiments, programmable logistics controller 910 monitors and controls aftercooler 350 and condensation module 410 so that the compressed contaminated gas exiting aftercooler 350 and condensation module 410 for delivery to condensation module 410 or condensation module 510 is within an optimal temperature range for the chosen condensation cycling. Compressed contaminated gas that is too cold will not effectively warm cold exhaust from air/refrigerant heat exchanger 516 and compressed contaminate gas that is too warm will be inefficiently cooled in condensation module 510 requiring cycle times to be increased to remove a substantial portion of contaminated vapors. Thus, the programmable logistics controller 910 controls the temperature of off gas exiting aftercooler 350 and regulates the flow of that off gas through or around condensation module 410 to provide an optimal compressed contaminated gas temperature to increase efficiency of the system and serves as an optimization step for off gas exiting condensation module 510.

For example, condensed off gas leaves compressor 330 at approximately 220° F. and approximately 155 PSI. Aftercooler 350 reduces the temperature from approximately 220° F. to approximately 85° F. As previously described, an initial condensate will be formed as the gas is initially cooled in aftercooler 350. The initial condensate is transferred to an initial contaminant recovery tank or, according to embodiments, to contaminant recovery module 800.

The off gas is transferred from aftercooler 350 to air/air heat exchanger 512 via vapor elimination inlet conduit 351 and a series defined by either control valve 402, vapor elimination conduit 403, condensation module 410, control valve 405, and vapor elimination conduit 402. According to embodiments, off gas entering air/air heat exchanger 512 via control valve 402 is cooled from approximately 85° F. to approximately 20° F., as the heat exchange occurs between the gas from aftercooler 350 and the cold gas from air/refrigerant heat exchanger 516. Further condensate is formed as the gas further cools to approximately 20° F. It is transferred to initial contaminant recovery tank 810 in contaminant recovery module 800 via contaminant recovery module conduit 520, according to embodiments. Specific gravity separator 808 may be included to separate contaminants by specific gravity and store separated chemical contaminants in multiple contaminant recovery tanks in contaminant recovery module 800.

According to the example, off gas entering air/air heat exchanger 512 via control valve 402, vapor elimination conduit 403, condensation module 410, and control valve 405 is cooled from approximately 75° F. to approximately 20° F., as the heat exchange occurs between the gas from aftercooler 350 and the cold gas from air/refrigerant heat exchanger 516. Further condensate is formed as the gas further cools to approximately 20° F. It is transferred to initial contaminant recovery tank 810 in contaminant recovery module 800 via contaminant recovery module conduit 520, according to embodiments. Specific gravity separator 808 may be included to separate contaminants by specific gravity and store separated chemical contaminants in multiple contaminant recovery tanks in contaminant recovery module 800.

Figure 9:
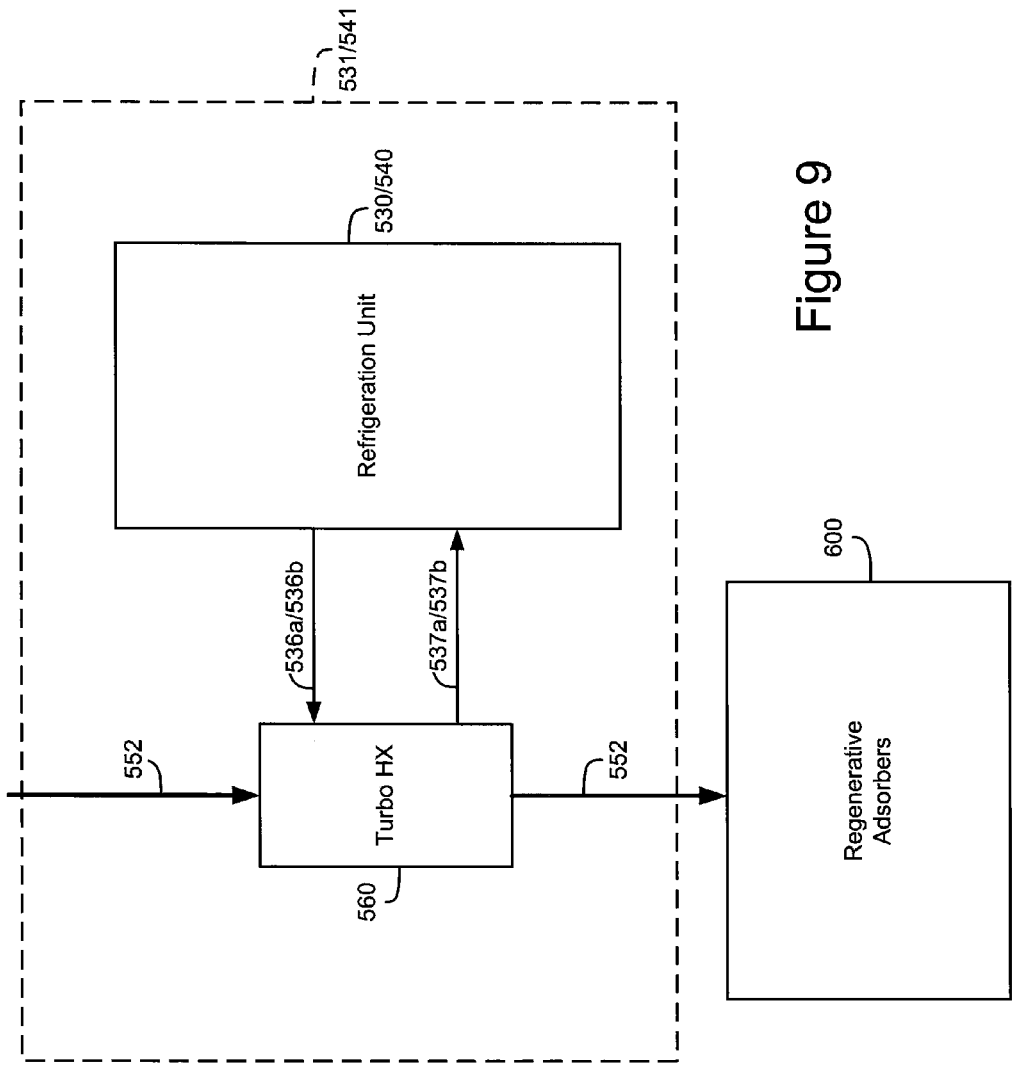
FIG. 9 is a block diagram of embodiments of refrigeration units.

The gas cooled to 20° F. then transfers to air/refrigerant heat exchanger 516 for further cooling to a cold gas from approximately 20° F. to approximately (−50)° F. due to the heat exchange between gas and refrigerant, as known to artisans. As depicted in FIGS. 8 and 9, refrigeration unit 531 and refrigeration unit 541 provide refrigerant via refrigerant inlet conduit 532 and refrigerant inlet conduit 542 to air/refrigerant heat exchanger 516 for cooling of the cold gas. To prevent blockages of frozen condensate, gas/gas heat exchanger 512 may be cycled with gas/refrigerant heat exchanger 516, as would be known to artisans. Thus, prior to freezing up, warmer gas from heat exchanger 512 is used to warm the cold gas in heat exchanger 516. After cooling, the refrigerant returns to refrigeration unit 531 and refrigeration unit 541 via refrigerant outlet conduit 534a, 524b and refrigerant outlet conduit 544a, 544b, according to embodiments. At this point in the process, virtually all water vapor has been removed from the off gas, but chemical vapors may remain due to varying dew points and vapor pressures.

According to another example, the gas cooled to 20° F. then transfers to air/refrigerant heat exchanger 516 for further cooling to a cold gas from approximately 20° F. to approximately (−30)° F. due to the heat exchange between gas and refrigerant, as known to artisans. As depicted in FIGS. 8 and 9, refrigeration unit 530 is turned on and refrigeration unit 540 is turned off. In this embodiment refrigeration unit 530 provides refrigerant via refrigerant inlet conduit 532 to air/refrigerant heat exchanger 516 for cooling of the cold gas. To prevent freezing up problems, gas/gas heat exchanger 512 may be cycled with gas/refrigerant heat exchanger 516, as would be known to artisans. Thus, prior to freezing up, warmer gas from gas/gas heat exchanger 512 is used to warm the cold gas in gas/refrigerant heat exchanger 516. After cooling, the refrigerant returns to refrigeration unit 530 via and refrigerant outlet conduit 544, according to embodiments. At this point in the process, virtually all water vapor has been removed from the gas, but chemical vapors may remain due to varying dew points and vapor pressures.

If the temperature of the off gas exiting the vapor elimination module via conduit 552 must is below about approximately 20° Fahrenheit, the efficiency of regenerative adsorber unit 600 may be degraded. Optimally, the temperature of the off gas entering regenerative adsorber unit 600 is about approximately 60° F. Similarly, when treated off gas exiting vapor elimination module 500 is routed directly back to the off gas source 010, a this warmer temperature is desired to assist in the volitization of pollutants to be extracted via vacuum, compression, and flow module 300. As viewed in FIGS. 8 and 9, when one or both refrigeration units 530, 540 are turned on, off gas exiting the return side of heat exchanger 512 is routed through conduit 552. Conduit 552 travels through refrigeration units 531, 541. In refrigeration unit 531, 541, off gas from conduit 552 enters heat exchanger 560. According to embodiments, heat exchanger 560 is a turbo heat exchanger made by Packless Industries. Off gas enters heat exchanger 560 at approximately −20° F., where it is exposed to coils containing warm air of approximately 110° F. from refrigeration condenser 530 or 540 that has entered heat exchanger 560 via conduit 536a or 536b. The off gas is warmed to approximately 60° F. in heat exchanger 560, and then exits via conduit 552.

According to embodiments, in air/refrigerant heat exchanger 516 final condensation occurs and the condensate is collected after thawing and transferred to contaminant recovery module 800 via contaminant recovery module conduit 520. The dry cold gas is then transferred to air/air heat exchanger to cool incoming warm gas from aftercooler 350 or vapor chiller module 400 and warm the dry cold gas from air/refrigerant heat exchanger 516 to prepare it for final treatment. According to embodiments, the gas treated by air/refrigerant heat exchanger 516 and routed through air/air heat exchanger 512 is then routed to regenerative adsorber unit 600 to remove residual chemical vapors via regenerative adsorber inlet conduit 652.

According to embodiments, multiple condensation modules 510 may be used in parallel or in series to improve efficiency of the condensation process. A person of ordinary skill in the art will understand that each remediation site may require optimization dependant on the particular contaminants at the site, their relative abundance, their vapor pressures, their dew points, and their specific heat of phase conversion.

This invention's optimizing improves it from existing systems, with condensation modules 510 used in parallel to provide for greater gas flow through the system. Conversely, condensation modules 510 may be used in series to expose contaminated vapor to subsequent condensation steps in an attempt to remove greater percentages of total contaminants during the condensation step, according to embodiments.

Figure 10:
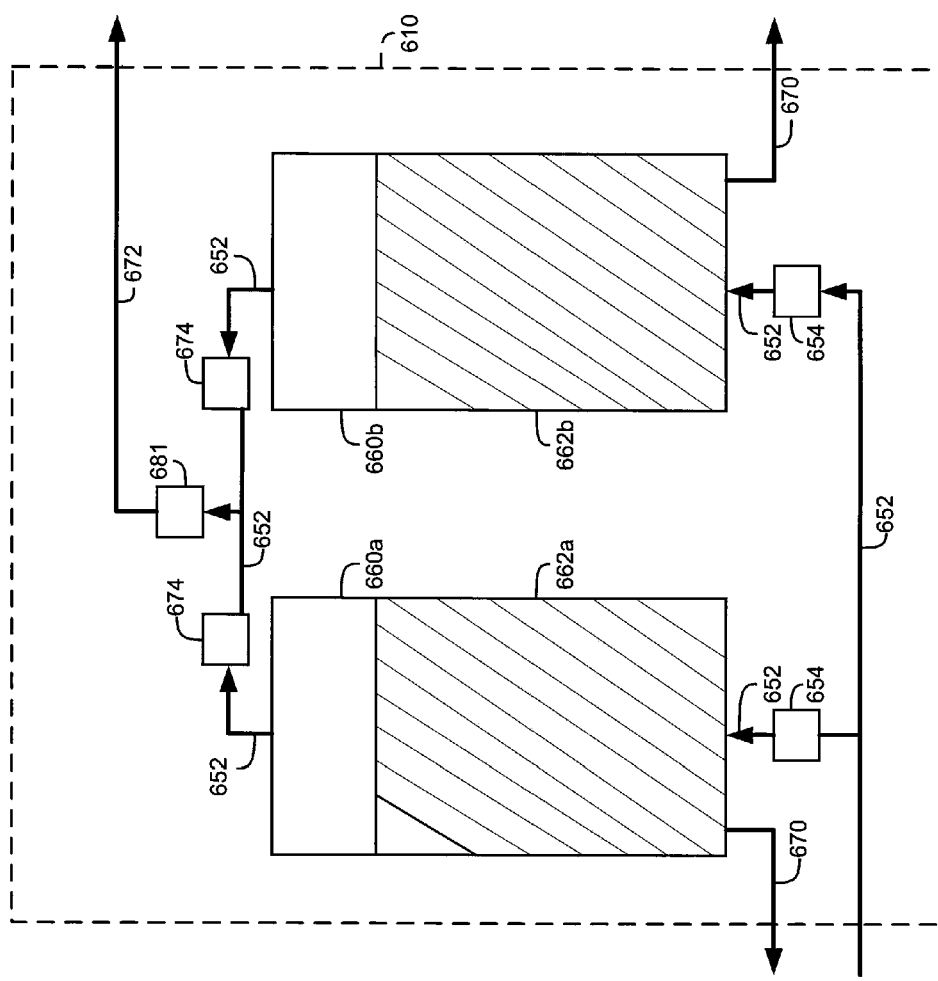
FIG. 10 is a block diagram of a regenerative adsorber module.

After the condensation step, residual contaminated vapor typically remains in the gas due to incomplete condensation or chemicals that are not cooled enough or for long enough for condensation to occur. According to embodiments illustrated in FIG. 10, high-pressure gas containing residual contaminated vapor is routed to regenerative adsorber module 610 via regenerative adsorber inlet conduit 652. As shown, two adsorption chambers 660a, 660b work in tandem to adsorb residual contaminated vapor. During operation, one adsorption chamber 660a, 660b adsorbs residual contaminated vapor while the other adsorption chamber 660b, 660a deadsorbs contaminated vapor. The process of desorption regenerates adsorption material 662a, 662b for re-adsorption of contaminated vapor.

According to an embodiment, an adsorption material 662a, 662b is activated alumina. A person of ordinary skill in the art will readily know and appreciate that other, similar materials may be used in adsorption module depending on the nature of the remediation site, the chemicals involved, and goals of each remediation project. Adsorption by adsorption materials, such as activated alumina, carbon, or resins, occurs at high pressure; desorption occurs at low pressure. Other similar materials and materials specifically suited to adsorption of specific chemicals are expressly contemplated as would be known to a person of ordinary skill in the art. Both adsorption and desorption are relatively temperature insensitive processes, which makes the present system superior for many types of remediation, such as with halogenated chemicals due to the lack of necessity to introduce heat and form strongly acidic byproducts as a result in the desorption process.

Off gas with residual contamination is introduced to regenerative adsorber module 610 via regenerative adsorber inlet conduit 652. Disposed between regenerative adsorber inlet conduit and each adsorption chamber 660a, 660b are inlet valves 654. Inlet valve 654 control which adsorption chamber 660a, 660b is adsorbing residual contaminated vapor and adsorption chamber 660a, 660b desorbing contaminated vapor. During the adsorption process, inlet valve 654 is in an open position allowing off gas containing residual contaminated vapor to enter adsorption chamber 660a, 660b and contact adsorption material 662a, 662b. During the desorption process, inlet valve 654 is in a closed position to prevent gas from entering adsorption chamber 660a, 660b.

During the adsorption process, gas containing residual contaminated vapor is forced through adsorption material 662a, 662b in adsorption chamber 660a, 660b. Adsorption material 662a, 662b removes vapor from the gas, including contaminated vapor. As vapor is removed from the gas, adsorption material 662a, 662b charges with contaminated vapor. Gas leaving adsorption chamber 660a, 660b is therefore substantially, about approximately 99.9%, free of VOCs. Artisans will recognize that one of flow rate of the gas containing contaminated vapor or cycle time will vary from remediation site to remediation site.

Depending on the types of chemicals being removed, the concentration of the contaminants, the relative amount of contaminated vapor removed in previous remediation steps, for example compression/condensation, and the efficiency of adsorption material 662a, 662b in removing particular vapors from the gas, the parameters within which the system runs will differ. Adsorption material 662a, 662b, surface area of adsorption material 662a, 662b, and other similar variables known to artisans will be evaluated and optimized on a per site basis. In some cases, multiple regenerative adsorption modules 610 will be used in series to accomplish a desired reduction in contaminated vapor passing through vapor elimination module 500.

According to embodiments where adsorption material 662a, 662b is activated alumina, adsorption of vapor in gas occurs at high pressure. For example and according to embodiments, cold gas leaving condensation module 510 is at approximately 150 PSI having been compressed prior to entering condensation module 510. After leaving condensation module 510 and entering regenerative adsorber module 610, gas pressure is still at approximately 150 psi.

Referring again to FIG. 10, once gas has been exposed to and caused adsorption material 662a, 662b to be charged with contaminated vapor, the exhaust is substantially clean. It escapes through clean exhaust conduit 672. Disposed on clean exhaust conduit 672 are clean exhaust valves 674, according to the exemplary embodiment. Generally, at least one clean exhaust valve 674 is disposed along clean exhaust conduit 672 per adsorption chamber 660a, 660b, although multiple clean exhaust valves 674 are contemplated as would be known to artisans. Clean exhaust conduit 672 releases substantially clean gas into vapor stream source 010, according to embodiments.

In one embodiment, back pressure regulator 681 is disposed along clean exhaust conduit 672 to maintain a baseline of pressure range of about approximately 130 to 150 psi throughout chemical recovery system 100.

According to embodiments, clean exhaust valves 674 shunts a portion of substantially clean gas for the purpose of desorption. When clean exhaust valve 674 is "closed," it allows a small flow of clean exhaust gas to flow to charged adsorption chamber 660a, 660b and through charged adsorption material 662a, 662b. This low pressure flow causes adsorption material 662a, 662b to release the contaminated vapors collected in the charging step. These vapors exit through exhaust conduit 670 as inlet valve 654 is closed for charged adsorption chamber 660a, 660b as the desorption step occurs.

To that end, clean exhaust valves 674 are configured to shunt a portion of the substantially clean gas into adsorption chamber 660a, 660b that is desorbing contaminated vapor. Because desorption occurs at lower pressure, a small percentage of the total clean exhaust gas is diverted as a low pressure gas to desorbing adsorption chamber 660a, 660b, while the remaining substantially clean gas continues through clean exhaust conduit 672. The process of shunting a small percentage of substantially clean gas may be accomplished by partially opening clean exhaust valve 674 or through the use of a multiple valve system, as would be known to artisans. For example, clean exhaust valve 674 may comprise one valve that allows low-pressure substantially clean gas to pass during adsorption chamber's 660a, 660b desorption cycle and a separate valve that may be fully opened to allow high-pressure substantially clean gas to escape during the adsorption cycle. The implementation of such a system will be known and understood by a person of ordinary skill in the art.

Consequently, as one adsorption chamber, e.g., 660a, of regenerative adsorber module 610 is being charged with contaminated vapors and exhausting substantially clean exhaust gas, adsorption chamber, 660b is being desorbed of contaminated vapors previously collected and contained in adsorption material 662b. Desorption occurs as a percentage of the substantially clean gas forming a low pressure flow is shunted into adsorption chamber 660b. After adsorption chamber 660a becomes fully charged, the system is reversed and adsorption chamber 660b is charged with contaminated vapors while adsorption chamber 660a is desorbed of the previously collected contaminated vapors.

During the desorption cycle of adsorption chamber 660a, 660b, adsorption material 662a, 662b starts in a state wherein adsorption material 662a, 662b is fully charged with contaminated vapor. As low-pressure substantially clean air is shunted into adsorption chamber 660a, 660b, vapor contained in adsorption material 662a, 662b is released from adsorption material 662a, 662b into the low-pressure substantially clean gas. The resultant gas comprises concentrated contaminated vapor. The gas containing the concentrated contaminated vapor is then routed through exhaust conduit 670 to vacuum and compression module 300 for recompression and rerouting through the compression/condensation process.

Multiple regenerative adsorber modules 610 may be placed in series or in parallel as a matter of efficiency to ensure adequate removal of particularly difficult contaminants. Moreover, efficiencies of the present system may provide for increased gas flow rates, and thus more rapid remediation of a polluted remediation site, due to increased efficiency of remediation and chemical recovery system 100 over conventional SVE systems.

Thus, artisans will appreciate that nearly all contaminated vapor from the ground is eliminated by compression/condensation. Vapor that escapes compression/condensation is captured by adsorption material 662a, 662b for reconcentration during the desorption process. The reconcentrated contaminated media will then be more readily condensed out during a second round of compression/condensation owing to the increased concentration of the contaminated vapor, where it would have originally escaped due to the fact that the concentration of contaminated vapor dropped below a critical point where no additional contaminated vapor of a given chemical could be condensed out of the gas. The compression/condensation-adsorption cycle is repeated until the measured volumetric concentration output of contaminant being removed shows the remediation site is substantially clean.

According to embodiments of a method for the removal of pollutants from a stream of off gas, off gas vapor is processed through a vapor elimination module, said vapor elimination module containing at least one air-to-air heat exchanger and at least one air-to-refrigerant heat exchanger, working in tandem, wherein off gas vapor is condensed in each heat exchanger and removed as a liquid from the vapor elimination module. The off gas vapor stream exiting the vapor elimination module will contain less pollutants than it contained when it entered the vapor elimination module. The nature and concentration of the pollutants, pressurization rate of the off gas stream, refrigerant used, number and size of condensation units used, cooling cycle time, and other factors known to artisans will determine the precise proportion and quantity of pollutants removed as condensed liquid from the vapor elimination module.

According to embodiments of a method for the operation of a vapor elimination module, the refrigerant flow is decreased to initiate a thawing cycle. The thawing cycle is needed to one or both prevent the freezing of condensate and remove frozen condensate from within both the air-to-air and air-to-refrigerant heat exchangers, especially their inlets and outlets. The thawing cycle is unique in that the air-to-air and air-to-refrigerant heat exchangers work in tandem to warm each other. Warm air flowing into the air-to-air heat exchanger traverses that heat exchanger and enters the air-to-refrigerant heat exchanger, where it warms that heat exchanger. The air exiting the air-to-refrigerant heat exchanger is warm enough to help thaw the air-to-air heat exchanger as it flows through the return side of that heat exchanger.

According to embodiments of a method for off gas extraction and processing shown in FIGS. 1-4, off gas vapor is extracted from an off gas source. These vapors, as previously discussed, contain vapors contaminated with pollutant. The off gas is extracted by means of a vacuum pump, blower, compressor, ring pump, or other device as known by artisans. For example, the off gas is compressed to about approximately 150 psi. The pressurized off gas enters aftercooler 350, where initial water and pollutant condensate are collected. Thereafter, the pressurized off gas enters condensation module 410. Condensation module 410 cools the gas further, causing contaminated vapors to condense into a liquid form that may be captured. Condensation module 410 then warms the cooled gas prior to its exit from the drying process. This warming function is integral to the functionality of the condensation process, especially the interaction between the air-to-air heat exchanging condensers and the air-to-refrigerant heat exchanging condensers in the vapor elimination process 500. Vapor elimination process 500 further cools the gas and causes much of the contaminated vapors to condense into a liquid form that may be captured. The drying and vapor elimination process recovers a large percentage of contaminated vapors from the gas stream. According to embodiments, the gas stream is then: (1) recirculated back to the off gas source, for example a storage tank, to create a closed-loop process; or (2) directed to a regenerative adsorber module 610, as shown in FIG. 2, that further removes any remaining contaminants from the air stream, and then recirculated back to the off gas source, for example a storage tank, to create a closed-loop process.

Likewise disclosed is a method for optimizing the use of the systems of this disclosures. The optimization method ensures efficient flow. Initially, plans are generated to do this based on the contaminants to be removed and the source of the contaminants. These plans may be directed towards general remediation of a site, to specific contaminants, or according to the directive of a regulatory authority, such as the United States Environmental Protection Agency, or the South Coast Air Quality Management District. Generally, the plan will include use of a degassing system, such as the closed-loop degassing system disclosed herein. Depending on the particular contaminants to be addressed and the source of those contaminants, optimizations of the system will address the particular parameters of the application.

For example, a railcar tank may be contaminated with difficult to remove contaminants such as vinyl chloride or freon that will be removed inefficiently by a drying and vapor elimination process alone. In these types of cases, for example, the flow of refrigerant through one or more heat exchangers in a vapor elimination module may be increased in order decrease the temperature of the off gas flowing through the heat exchangers to optimize the recovery of liquid phase condensate. Additionally, the freezing and thawing cycles of the vapor elimination module may be varied and optimized based on the plan. Furthermore, a regenerative adsorber module may be added after a vapor elimination module any residual pollutants not recovered as liquid phase condensate. Similarly, decisions may be made to use systems with multiple compression and condensation modules and regenerative adsorber modules in series or in parallel, depending on embodiments. Similarly, the adsorption and desorption of the regenerative adsorber module may be cycled to adjust the system to site conditions, as necessary and according to embodiments.

In a different example, a degassing site containing a 150 foot diameter above ground storage tank with petroleum hydrocarbon vapors will be efficiently degassed using a compression, vapor drying, and vapor elimination process. Some residual pollutants may still be present in the treated air stream that is returned to the storage tank, but after the degassing process is complete, the concentration of the gasses present in the storage tank will be below safe LEL levels.

EXAMPLES

Example 1

An above-ground storage tank at an active refinery site is selected for remediation, wherein the system optimization is conducted to maximize the efficiency of the vapor extraction system and expedite tank degassing. The vapor extraction system targets petroleum hydrocarbon-impacted vapors inside the storage tank.

One mobile vapor extraction system is installed at the site, adjacent to the storage tank to be treated. The vapor extraction system is rated at 300 scfm capacity. This system draws and processes off gas from the storage tank via a 6 inch diameter flex hose. One end of this flex hose is connected to an adaptation that creates an airtight seal around the open, front access cover of the storage tank. The other end of this flex hose is routed to the vapor extraction system's vacuum, compression, and flow module.

Figure 3:
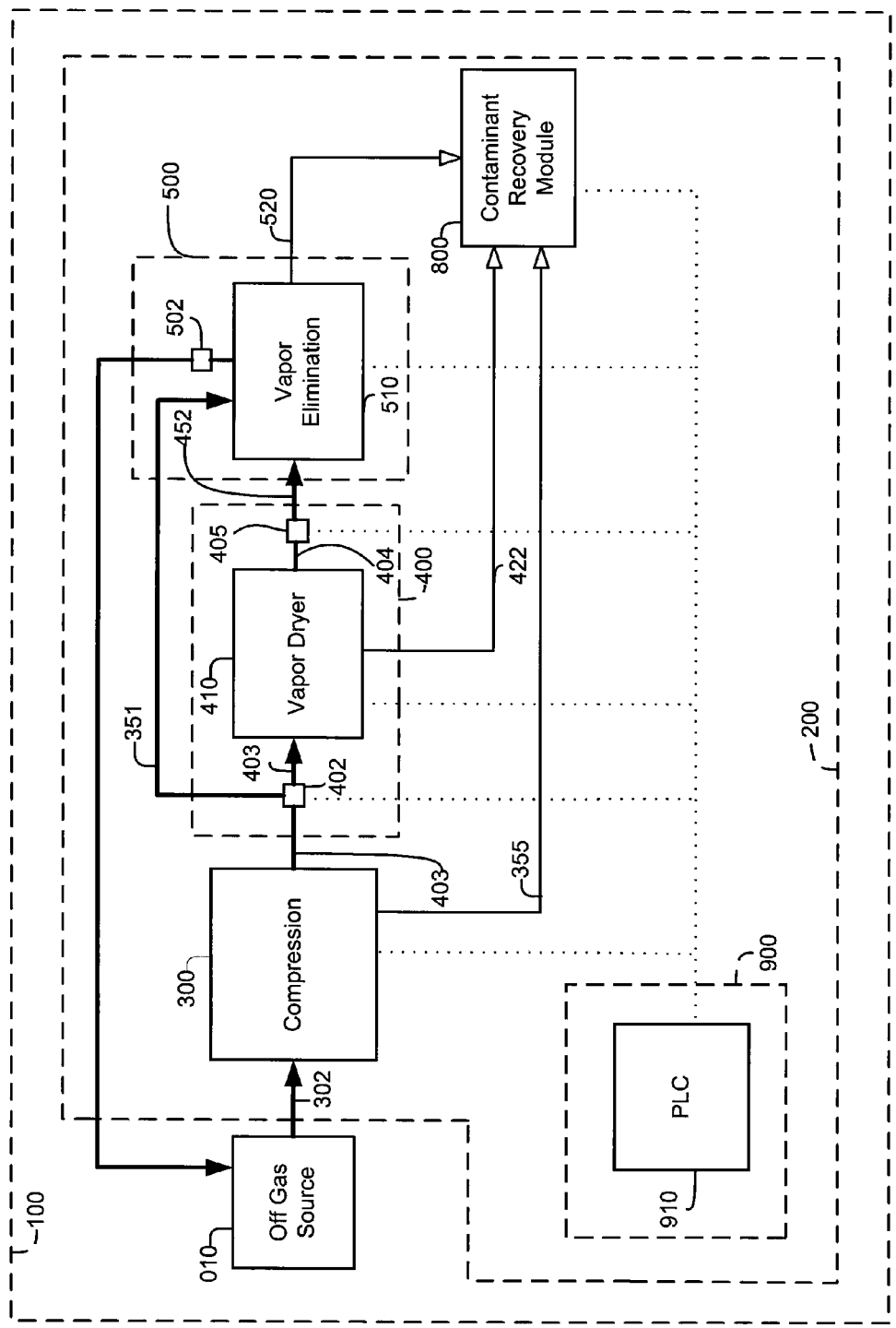
FIG. 3 and FIG. 4 are block diagrams of embodiments of an off gas treatment system with the addition of programmable logistics controller module.
Figure 4:
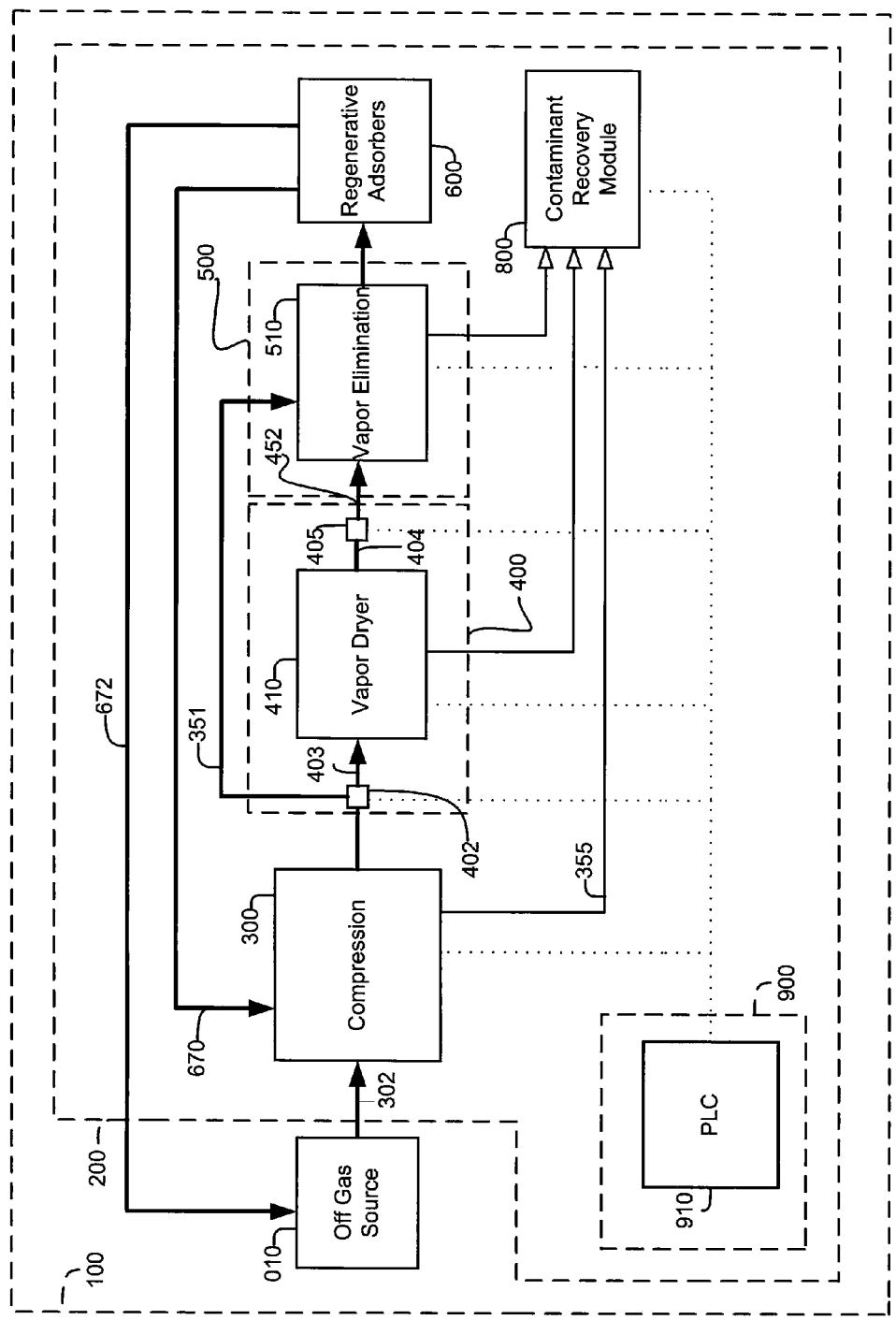

As depicted in FIG. 3, the vapor extraction and recovery system comprises a vacuum module, a vacuum, compression, and flow module 300, a vapor dryer module 400, a vapor elimination module 500, a contaminant recovery module 800, and a programmable logistics controller module 900. The vacuum, compression, and flow module consists of one Atlas Copco Model ZE 375 hp air compressor capable of compressing 310 scfm of off gas to 50 psi while delivering a vacuum of 2 in. Hg. and one specially fabricated stainless steel air-to-air heat exchanger with condensation drain capable of cooling 350 cfm flow at 50 psi. The vapor dryer module consists of one Great Lakes Model ERF-500A-236 refrigerant air dryer, rated for up to 230 psi for a 35-39° F. pressure dew point. The vapor elimination module consists of two pairs of air-to-air heat exchangers and air-to-air heat exchangers working in line.

The vapor extraction and recovery system delivers recovered, condensed pollutants and water collected from the off gas stream to contaminant recovery module 800, a series of two interconnected 750 gallon storage tanks. One inlet is present on the first storage tank of the interconnected series of storage tanks. Water delivered to the interconnected series of storage tanks accumulates in this first storage tank, with LNAPL and petroleum pollutants also collecting in this first storage tank and overflowing into the second storage tank of the interconnected series of storage tanks. LNAPL is collected from the second storage tank and the bottom of the first storage tank of the interconnected series of storage tanks and, after the tank degassing is complete, transferred back to the storage tank that was the original source of the off gas stream via a portable transfer pump. The remaining water and trace pollutant is removed for off site disposal.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. This disclosure includes any and all embodiments of the following claims.

The invention claimed is:
1. A device comprising:
a vapor dryer configured to remove substantially all the water vapor from a contaminated off gas, wherein the off gas exhausted from the vapor dryer is substantially dry;
a vapor elimination device having a plurality of heat exchange modules, the off gas being input into a first heat exchange module to cause recovery of the first heat exchange module that has been cooled by warming it and thereby causing the off gas to experience a net cooling, the off gas then being input into a second heat exchange module to further cool the off gas; and a collection module for collecting liquid contaminants that are condensed at each heat exchange module;

wherein each heat exchange module comprises at least one air-to-air heat exchanger and at least one air-to-refrigerant heat exchanger and wherein the heat exchange modules are used to warm and cool the off gas;

wherein the plurality are two heat exchange modules, wherein the heat exchange modules reciprocally work together to cause recovery of the first heat exchange module while the second heat exchange module causes further cooling of the off gas, and periodically reversing the flow of off gas wherein the second heat exchange module recovers while the first heat exchange module further cools the off gas;

wherein the flow of off gas through the vapor elimination device is controlled by valve and flows in a first or a second configuration;

wherein the first configuration comprises flowing the off gas through a first heat exchange module air-to-air heat exchanger, then through a first heat exchange module air-to-refrigerant heat exchanger, then through a second heat exchange module air-to-air heat exchanger, and then through a second heat exchange module air-to-refrigerant heat exchanger; and wherein the second configuration comprises flowing the off gas through the second heat exchange module air-to-air heat exchanger, then through the second heat exchange module air-to-refrigerant heat exchanger, then through the first heat exchange module air-to-air heat exchanger, and then through the first heat exchange module air-to-refrigerant heat exchanger.

2. A pollutant condensation device comprising:

a vapor dryer having at least one air-to-air heat exchanger, at least one air-to-refrigerant heat exchanger, a refrigeration unit, and an condensate conduit;

wherein an exhaust gas from the air-to-refrigerant heat exchanger is used to cool an intake gas into the air-to-air heat exchanger and the intake gas into the air-to-air heat exchanger is used to warm the exhaust gas from the air-to-refrigerant heat exchanger;

a vapor elimination device having a plurality of heat exchange modules comprising at least a first heat exchange module and a second heat exchange module and valves controlling the flow of the off gas to each respective heat exchange module, each heat exchange module comprising at least one air-to-air heat exchanger, at least one air-to-refrigerant heat exchanger, and at least one collection can;

wherein the off gas input into the vapor elimination device is routed through the first heat exchange module wherein the off gas is cooled as it flows through the first heat exchange module thereby warming the components of the first heat exchange module before being further cooled in the second heat exchanger module, thereby further condensing pollutants;

wherein when the efficiency of the second heat exchange module is reduced or after a predetermined period, the valves in the vapor elimination device are adjusted so that off gas input in the vapor elimination device is router through the second heat exchange module prior to being further cooled in another heat exchange module;

wherein the off gas being exhausted from a heat exchange module air-to-refrigerant heat exchanger in each heat exchange module is used to cool the off gas being input into a heat exchange module air-to-air heat exchanger and the off gas being input into the heat exchange module air-to-air heat exchanger is used to warm the off gas being exhausted from the heat exchange module air-to-refrigerant heat exchanger;

wherein the condensate conduit carries condensate formed as the off gas is cooled from the vapor elimination device to a condensate storage device.

3. The pollutant condensation device of claim 2, wherein the off gas exhausted from the vapor elimination device is routed to a source of the off gas.

4. The pollutant condensation device of claim 3, wherein the source of the off gas is a container used to hold fluids.

5. The pollutant condensation device of claim 2, wherein the plurality are two heat exchange modules, wherein the heat exchange modules reciprocally work together to cause recovery of the first heat exchange module while the second heat exchange module causes further cooling of the off gas, and periodically reversing the flow of off gas wherein the second heat exchange module recovers while the first heat exchange module further cools the off gas.

6. The pollutant condensation device of claim 5, wherein the flow of off gas through the vapor elimination device is controlled by the valves and flows in a first or a second configuration;

wherein the first configuration comprises flowing the off gas through a first heat exchange module air-to-air heat exchanger, then through a first heat exchange module air-to-refrigerant heat exchanger, then through a second heat exchange module air-to-air heat exchanger, and then through a second heat exchange module air-to-refrigerant heat exchanger; and wherein the second configuration comprises flowing the off gas through the second heat exchange module air-to-air heat exchanger, then through the second heat exchange module air-to-refrigerant heat exchanger, then through the first heat exchange module air-to-air heat exchanger, and then through the first heat exchange module air-to-refrigerant heat exchanger.

7. The pollutant condensation device of claim 2, wherein the vapor dryer reduces the temperature of the off gas to about or above the pressure dew point of water.

8. The pollutant condensation device of claim 2, wherein the vapor dryer reduces the temperature of the off gas to about 34° F. to about 40° F.

9. A method of controlling water vapor content in an off gas stream comprising:

routing an off gas through a vapor dryer, the vapor dryer being configured to removed substantially all the water content in the off gas to produce a substantially dry off gas, the vapor dryer;

routing the substantial off gas through a vapor elimination module configured to condense contaminated vapors out of the off gas to produce a substantially clean off gas, the vapor elimination module having a plurality of heat exchange modules, the off gas being input into a first heat exchange module to cause recovery of the first heat exchange module by warming it thereby causing the off gas to experience a net cooling, the off gas then being input into a second heat exchange module to further cool the off gas and create a substantially clean off gas; and in response to a drop in efficiency in the performance of the second heat exchange module or a predetermined time period, altering the flow of the off gas through the vapor elimination module whereby the substantially dry gas is input into the second heat exchange module to cause recovery of the second heat exchange module followed by routing the substantially dry off gas to another heat exchange module for further cooling and creation of the substantially clean off gas;

wherein each heat exchange module comprises at least one air-to-air heat exchanger and at least one air-to-refrigerant heat exchanger and wherein the heat exchange modules cool and warm the off gas.

10. The method of claim 9, wherein the off gas exhausted from the vapor elimination module is routed to a source of the off gas.

11. The method of claim 10, wherein the source of the off gas is a container used to hold fluids.

12. The method of claim 9, wherein the vapor dryer reduces the temperature of the off gas to about or slightly above the pressure dew point of water.

13. The method of claim 9, wherein the vapor dryer reduces the temperature of the off gas to about 34° F. to about 40° F.

* * * * *